United States Patent [19]
Kennedy et al.

[11] Patent Number: 6,005,051
[45] Date of Patent: Dec. 21, 1999

[54] MULTI-COMPONENT POLYMERIC NETWORKS CONTAINING POLYISOBUTYLENE

[75] Inventors: Joseph P. Kennedy, Akron; Melissa A. Sherman, Fairlawn, both of Ohio

[73] Assignee: The University of Akron, Akron, Ohio

[21] Appl. No.: 08/998,907

[22] Filed: Dec. 29, 1997

Related U.S. Application Data

[60] Provisional application No. 60/054,859, Aug. 6, 1997.

[51] Int. Cl.$^6$ ...................................................... C08F 8/00
[52] U.S. Cl. ............................................. 525/106; 528/15
[58] Field of Search ................................. 525/106; 528/15

[56] References Cited

U.S. PATENT DOCUMENTS

| | | | |
|---|---|---|---|
| 5,663,245 | 9/1997 | Kennedy et al. | 525/106 |
| 5,728,768 | 3/1998 | Saxena et al. | 525/106 |
| 5,856,392 | 1/1999 | Kennedy et al. | 525/479 |

*Primary Examiner*—Melvyn I. Marquis
*Attorney, Agent, or Firm*—Renner, Kenner, Greive, Bobak, Taylor & Weber

[57] ABSTRACT

Various polymeric compositions, including bicomponent networks and multiblock copolymers, containing polyisobutylene are synthesized by linking a plurality of polyisobutylene polymer chains with siloxane compounds having at least two SiH moieties. Specifically, bicomponent networks are synthesized by linking multifunctional polyisobutylenes, preferably tri-telechelic allyl-terminated polyisobutylenes, with multifunctional linear polysiloxanes, such as di-telechelic linear SiH-terminated polydimethylsiloxane, by hydrosilation. Similarly, multiblock copolymers are synthesized by endlinking difunctional allyl-terminated polyisobutylenes with difunctional SiH-terminated linear polysiloxanes, such as polydimethylsiloxanes, by hydrosilation. Still other polymeric networks comprising polyisobutylene are synthesized by linking multifunctional polyisobutylenes, preferably di- or tri-telechelic allyl-terminated polyisobutylenes, with multifuntional SiH-containing compounds, preferably cyclosiloxanes such as hexamethylhexahydrocyclosiloxane, by hydrosilation.

23 Claims, 2 Drawing Sheets

MULTI-COMPONENT POLYMERIC NETWORKS CONTAINING POLYISOBUTYLENE

CROSS REFERENCE TO RELATED APPLICATION

This application claims priority from provisional U.S. Application Ser. No. 60/054,859, filed Aug. 6, 1997.

The research disclosed in this application was at least partially supported by the National Science Foundation under Grant DMR—23202.

TECHNICAL FIELD

This invention relates generally to polymeric compositions, including bicomponent networks and multi-block copolymers, containing polyisobutylene. More particularly, the present invention relates to the synthesis of various novel compositions, including bicomponent networks and multiblock copolymers, containing polyisobutylene by linking a plurality of polyisobutylene polymer chains with siloxane compounds having at least two SiH moieties. Specifically, the bicomponent networks are synthesized by linking multifunctional polyisobutylenes, preferably tri-telechelic allyl-terminated polyisobutylenes, with multifunctional linear polysiloxanes, such as di-telechelic linear SiH-terminated polydimethylsiloxane, by hydrosilation. Similarly, multiblock copolymers may be synthesized by endlinking difunctional allyl-terminated polyisobutylenes with difunctional SiH-terminated linear polysiloxanes, such as polydimethylsiloxanes, by hydrosilation. Still other polymeric networks comprising polyisobutylene may be synthesized by linking multifunctional polyisobutylenes, preferably di- or tri-telechelic allyl-terminated polyisobutylenes, with multifuntional SiH-containing compounds, preferably cyclosiloxanes such as hexamethylhexahydrocyclosiloxane, by hydrosilation.

BACKGROUND OF THE INVENTION

With the discovery of living cationic polymerization, the synthesis of polyisobutylenes (PIBs) with controlled molecular weight and quantitative end functionality was made possible. Today, it is known that allyl-terminated ($\sim CH_2C(CH_3)_2$—$CH_2CH=CH_2$) polyisobutylenes can be quantitatively endlinked by hydrosilation with molecules containing an SiH moiety. This reaction results in the formation of a hydrolytically stable Si-C bond. Heretofore, however, research into the usefulness of the quantitative end functionality of polyisobutylene and the ability of allyl-terminated PIBs to be endlinked via hydrosilation with siloxane compounds has centered on the production of star polymers and star block copolymers. For instance, U.S. Pat. No. 5,663,245 teaches the synthesis and characterization of multi-arm star polymers comprising polyisobutylene arms emanating from a well-defined siloxane core. Star block copolymers have been produced using polyisobutylene-b-polystyrene arms emanating from a well-defined siloxane core. There has been little, if any, study into the usefulness of this synthesis reaction in the production of networks such as bicomponent networks or multi-block copolymers.

The polymeric networks of the present invention, and particularly bicomponent networks (BCNs), should be distinguished from more traditional interpenetrating polymer networks (IPNs). A BCN is defined as a single elastomeric network comprising two chemically different covalently bonded sequences; whereas, an IPN consists of two or more unlinked independent networks. The distinction to be made is significant in that the polymers in the IPNs are not linked chemically, but rather are two separate networks tangled within one another. Most two-component systems studied to date concern IPNs, with very few studies having been performed using BCNs. The distinction between BCNs and IPNs is more particularly set forth schematically hereinbelow.

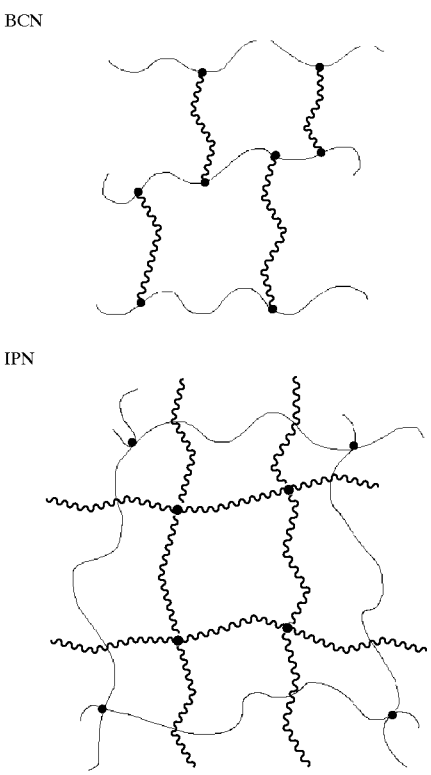

It will be appreciated that multiblock copolymers are like BCNs in that they also comprise two chemically different covalently bonded sequences, but are not crosslinked in the manner that BCNs are crosslinked. Rather, multiblock copolymers are linear blocks of at least two polymers, such as, for the present invention, polyisobutylene (-A-) and any of a number of difunctional linear polysiloxanes (-B-), endlinked together to form multiple block copolymers (-A-B-)n. Notably, these block copolymers are synthesized differently from "regular" block copolymers in that the polymers (-A-) and (-B-) are already formed before endlinking takes place. However, they are not "bicomponent networks" either, as defined hereinabove, because they are not crosslinked and, therefore, are not elastomeric in nature and are soluble in various solvents.

BCNs traditionally have required that the two crosslinked components at least contribute theoretically to the physical and chemical characteristics of the polymeric networks. That is, the properties of the bicomponent network will reflect those of the individual components. For example, bicomponent networks containing polyisobutylenes and polysiloxanes may be of great interest to the extent that polyisobutylene is known for low cost, superior mechanical properties, extremely low gas permeability and excellent environmental, hydrolytic and high temperature resistance while, in contrast, siloxanes are relatively expensive, have poor mechanical properties, but excel in regard to high gas permeability, low surface energy and biocompatibility. Thus, it is believed that elastomeric BCNs with varying ratios of polyisobutylene to polysiloxane such as polydimethylsiloxane (PDMS) may be of use to control gas permeability, water repellency, environmental stability and biocompatibility.

It will be appreciated that polymeric networks may also be formed from two components, but the second component may be used in such small and insignificant amounts that the second component would not contribute to the physical and chemical characteristics of the polymeric network. In this instance, the network is not considered a "bicomponent network" as defined hereinabove, inasmuch as the properties of the network are essentially the same as the properties of the primary (first) component.

These polymeric networks, including particularly, BCNs and other networks containing polyisobutylene of known structure, and especially those with desirable or known number average molecular weights between crosslinks ($\overline{Mc}$) and easily obtainable crosslinking functionalities, may be very useful for the study of rubber elasticity theories and for the possible extension of these theories to two-component systems, since the polyisobutylene prepolymers and siloxanes are well-defined and can easily be characterized prior to crosslinking.

SUMMARY OF THE INVENTION

It is, therefore, an object of the present invention to provide a polymeric composition of at least two chemically different components covalently bonded together.

It is another object of the present invention to provide a bicomponent network or a multiblock copolymer of well-defined structure containing a multifunctional polyisobutylene and a linear polysiloxane such as polydimethylsiloxane.

It is still another object of the present invention to provide a polyisobutylene network of well-defined structure, having a known number average molecular weight between crosslinks ($\overline{Mc}$), containing a multifunctional allyl-terminated polyisobutylene endlinked with a SiH containing compound, such as a cyclosiloxane.

It is yet another object of the present invention to provide a polymeric composition which is elastomeric and, therefore, insoluble in solvents.

It is a further object of the present invention to provide a method for the synthesis of a bicomponent network, as above, by endlinking a tri-functional allyl-terminated polyisobutylene with di-functional SiH-terminated polydimethylsiloxane by hydrosilation.

It is still a further object of the present invention to provide a method for the synthesis of a multiblock copolymer, as above, by endlinking a di-functional allyl-terminated polyisobutylene with di-functional SiH-terminated polydimethylsiloxane by hydrosilation.

It is yet a further object of the present invention to provide a method for the synthesis of a polyisobutylene network, as above, by endlinking a di- or tri-telechelic allyl-terminated polyisobutylene with a SiH-containing compound such as hexamethylhexahydro-cyclosiloxane by hydrosilation.

At least one or more of the foregoing objects, together with the advantages thereof over the known art relating to polymeric networks and multiblock copolymers, which shall become apparent from the specification which follows, are accomplished by the invention as hereinafter described.

In general, the present invention provides a composition comprising the hydrosilation reaction product of a plurality of multi-functional, allyl-ended polyisobutylenes linked to a plurality of multi-functional siloxane compounds having at least two SiH moieties.

The present invention also provides a bicomponent network comprising the hydrosilation reaction product of a plurality of multi-functional, allyl-terminated polyisobutylenes endlinked by a plurality of ditelechelic, linear polysiloxanes having at least two SiH moieties, the bicomponent network having its chemical and physical properties determined by both the polyisobutylenes and the polysiloxanes.

The present invention further provides a multiblock copolymer comprising the hydrosilation reaction product of a plurality of ditelechelic, allyl-terminated polyisobutylenes endlinked to a plurality of ditelechelic, linear polysiloxanes having up to two SiH moieties, the multiblock copolymer having its chemical and physical properties determined by both the polyisobutylenes and the polysiloxanes.

Still further, the present invention provides a polymeric network comprising the hydrosilation reaction product of a plurality of multi-functional, allyl-terminated polyisobutylenes linked to a plurality of multi-functional siloxane compounds having at least two SiH moieties.

Still other objects and aspects of the present invention may be achieved by a method for synthesizing a polymeric network composition comprising linking a plurality of multi-functional, allyl-terminated polyisobutylenes with a plurality of siloxane compounds having at least two SiH moieties by hydrosilation.

PREFERRED EMBODIMENT FOR CARRYING OUT THE INVENTION

Figure 1:
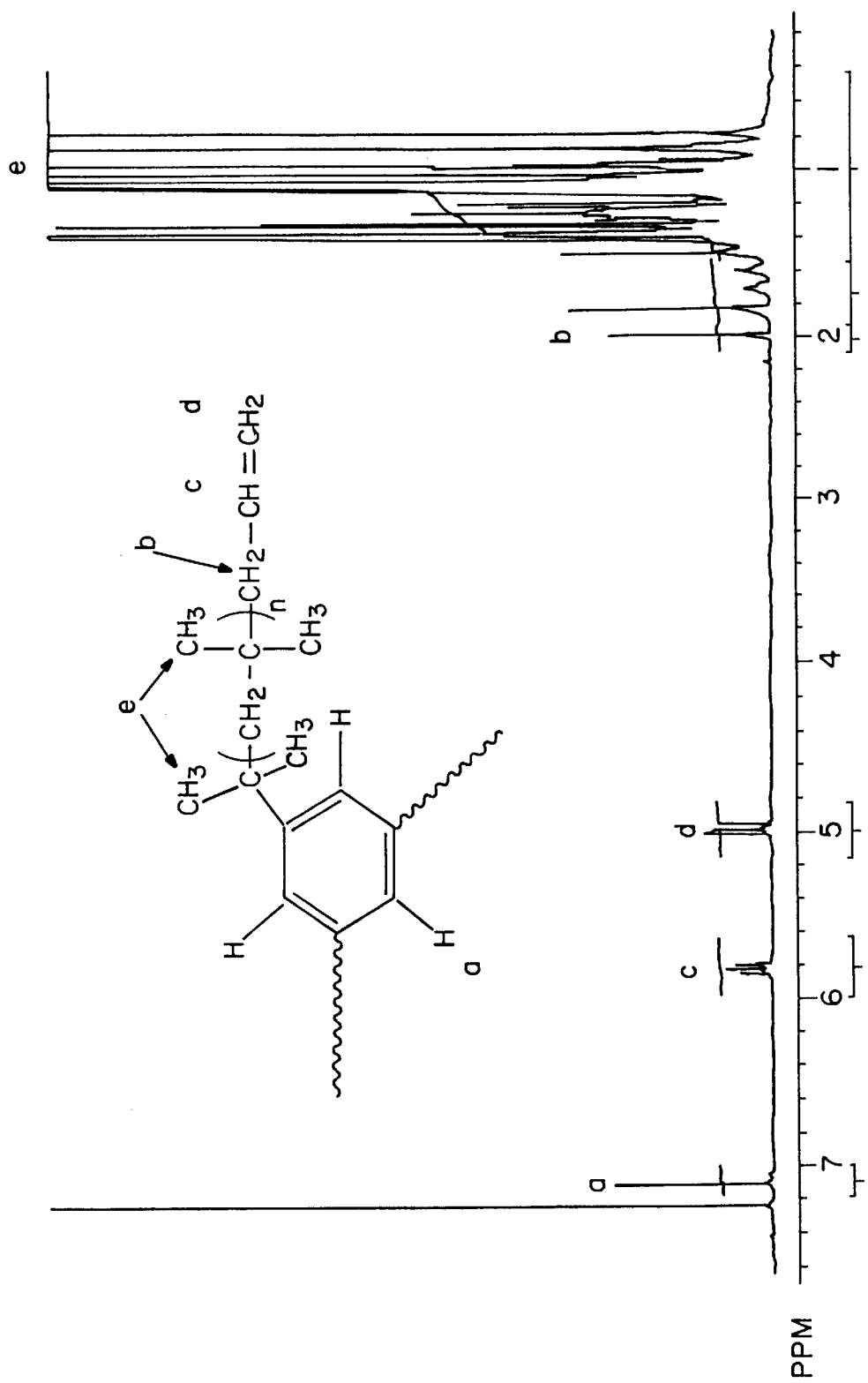
FIG. 1 is a representative graph of a proton NMR spectrum of R(PIB-allyl)$_3$.

The present invention is directed toward the synthesis of polymeric compositions, including bicomponent networks and multiblock copolymers, containing multifunctional polyisobutylenes and multifunctional compounds having one or more SiH moieties. More particularly, the present invention seeks to take advantage of the known hydrosilation reaction to endlink allyl-terminated polyisobutylenes and molecules, such as siloxanes, containing an SiH moiety so as to provide new useful polymeric compositions containing polyisobutylene. It will be appreciated that for purposes of this invention, "polymeric compositions" refers to those compositions which comprise two chemically different covalently bonded sequences, such as for example, polyisobutylene and polysiloxane, and includes bicomponent networks, multiblock copolymers, and other related networks as set forth herein.

Bicomponent networks having well-defined polyisobutylenes can be synthesized by endlinking a multi-functional, allyl-terminated polyisobutylene with a well-defined di-functional, SiH terminated linear polysiloxane by hydrosilation. These BCNs of the present invention are elastomeric and insoluble in solvents, and are believed to have significant ramifications in the elastomeric rubber industry. Since the polyisobutylene prepolymers and siloxanes are well-defined and can be easily characterized prior to crosslinking, networks of polyisobutylene and polysiloxane having specific molecular weights between crosslinks ($\overline{Mc}$) and crosslink functionality can be obtained.

More particularly, new bicomponent polyisobutylene (PIB)/polydimethylsiloxane (PDMS) networks have been synthesized by endlinking tri-telechelic PIB with di-telechelic PDMS as shown in the scheme hereinbelow.

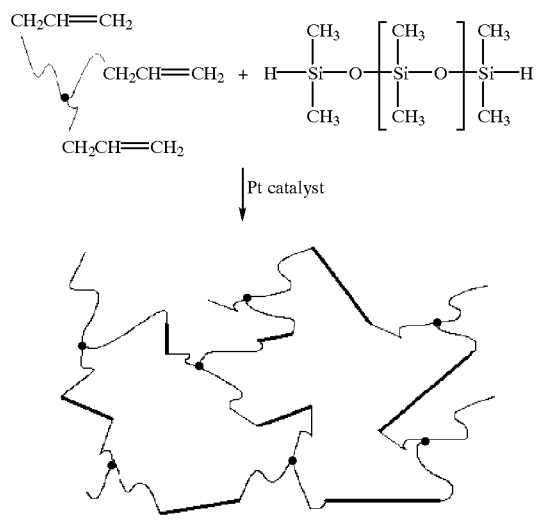

In a similar manner, new multiblock copolymers having well-defined polyisobutylenes and siloxanes can be synthesized by endlinking a di-functional, allyl-terminated polyisobutylene with a di-functional, SiH terminated linear polysiloxane by hydrosilation. Where PIB and PDMS are utilized, the reaction scheme would produce new multiblock PIB/PDMS copolymers, as set forth in the scheme hereinbelow. The new multiblock copolymers could be used as emulsifying or compatibilizing agents.

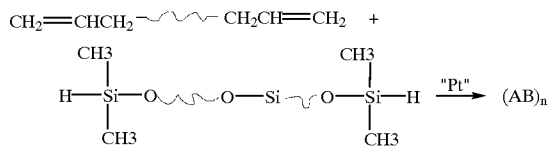

Still further, it will be appreciated that, where the amount of polyisobutylene simply overwhelms the amount of SiH moiety-containing molecules in the new composition, new polyisobutylene networks are synthesized. These polyisobutylene networks contain multifunctional, and preferably di- or tri-telechelic, allyl-terminated polyisobutylenes and SiH-containing siloxane compound. More preferably, the polyisobutylene networks are synthesized by endlinking a di- or tri-telechelic allyl-terminated polyisobutylene with cyclosiloxanes by hydrosilation. Such cyclosiloxanes may generally be of the formula

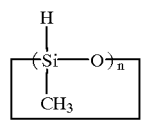

where n=3 to 16 or more.

In fact, polyisobutylene networks with well-defined structure have been synthesized by endlinking a di- and tri-telechelic polyisobutylenes having a known number average molecular weight ($\overline{M}n$) with a SiH containing cyclosiloxane compound of suitable functionality, namely hexamethyl-hexahydrocylosiloxane ($D_6^H$). Notably, the hydrosilation reaction of a di- and tri-telechelic PIBs with $D_6^H$ results in the formation of an elastomer which is insoluble, while the reaction of di-telechelic PIBs with a di-functional siloxane does not. The reactions of di- and tri-telechelic polyisobutylenes with $D_6^H$ are illustrated in the scheme set forth, respectively, hereinbelow.

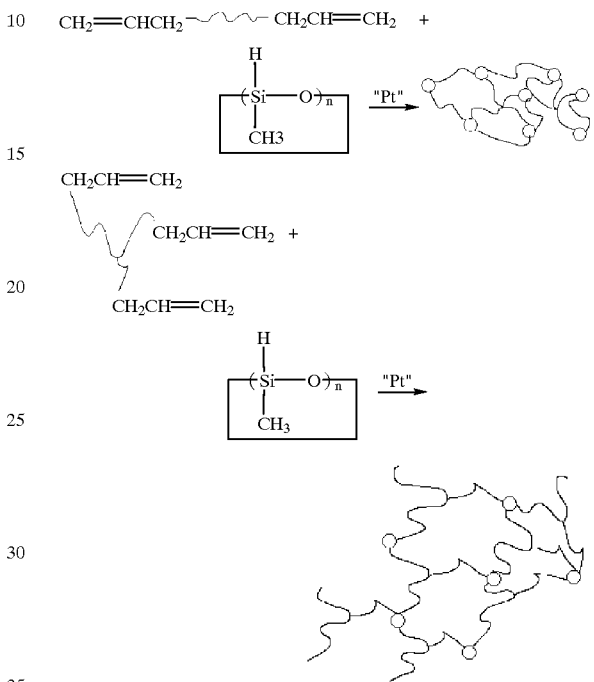

where n=6.

It will be appreciated that the di- and tri-telechelic PIBs and siloxane components are linked. Accordingly, it is possible that, if the siloxane component becomes of sufficient molecular weight and size, the network could form a bicomponent network. It is possible that a cyclosiloxane component other than $D_6^H$ may be used, and if the siloxane component becomes of sufficient molecular weight and size, a network-like structure could form that would only swell but not dissolve in solvents.

To synthesize the polymeric compositions, multi-telechelic, allyl-ended polyisobutylene is initially synthesized as known in the art. The allyl-ended PIBs may be prepared by living polymerization of isobutylene to practically any lengths (and, therefore, to practically any desired molecular weight) followed by quantitative end-functionalization to the —CH2CH=CH2. As a preferred embodiment, α-tert-butyl-ω-allyl-polyisobutylene precursors may be prepared by a one-pot, two-step method well known in the art. More particularly, living isobutylene polymerization can be induced to obtain chlorine terminated polyisobutylenes by the use of a 2-chloro-2,4,4-trimethylpentane/TiC14 initiating system in the presence of N,N-dimethylacetamide as the electron pair donor. A more detailed description of this procedure is set forth in "Electron Pair Donors in Carbocationic Polymerization, III. Carbonation Stabilization by External Electron Pair Donors in Isobutylene Polymerization". Kaszas et al., *J. Macromol. Sci., Chem.*, A26, 1099–1114(1989), the disclosure of which is incorporated herein by reference. After completion of the polymerizations, allylation of the living polyisobutylenes may be achieved by then quenched in situ with an excess of allyltrimethylsilane (AllSiMe$_3$), to provide the allyl-terminated PIBs. A more detailed description of this procedure is set forth in "Electrophilic Substitution of Organosilicon Compounds II., Synthesis of Allyl-terminated Polyisobutylenes by Quantitative Alkylation of tert-Chloro-Polyisobutylenes with Allyltrimethylsilane", Wilczek et al., *J. Polym, Sci.: Polym. Chem.* 25, 3255–3265 (1987), the disclosure of which is also incorporated herein by reference. The resultant allyl-terminated PIBs may then be characterized by H-NMR spectroscopy, gel permeation chromatography (GPC), and differential scanning calorimetry (DSC).

Separate from the preparation of polyisobutylene, siloxane polymers may be prepared. For example, di-functional SiH-terminated polydimethylsiloxanes ($M_2^H D_n$, where n equals the number average degree of polymerization) can be synthesized by acid-catalyzed equilibration of the cyclic tetramer, $D_4$, in the presence of the corresponding chain stopper, tetramethyldisiloxane, $M_2^H$. The polysiloxanes can then be characterized by H-NMR spectroscopy and DSC. Where a cyclosiloxane is desired such as hexamethylcyclohexasiloxane ($D_6^H$), it can be prepared by the hydrolysis of methyldichlorosilane, as is well known in the art and as is more particularly described in U.S. Pat. No. 3,484,468, the disclosure of which is incorporated by reference.

Once the desired PIB and siloxane prepolymers were formed, the allyl-terminated PIB precursors can be linked to the well-defined siloxanes containing a desirable number of SiH functions by hydroslilation. In doing so, the polyisobutylene can be dissolved in toluene (30% wt, PIB), and 1-ethynyl-1-cyclohexanol (Aldrich) may be added as a retarder of hydrosilation, if desired. It have been found that using a retarder significantly decreases the amount of cure shrinkage. 500 ppm of a $H_2PtCl_6$ catalyst solution is then added and the solution is mixed, poured into a Teflon mold, covered and placed in an oven at about 60° C. for about 48 hours and about 90° C. for about 24 hours. The network samples may then be removed from the oven.

To confirm hydrosilation efficiency, the amount of extractables (sol fraction) can be determined post cure. The network samples are weighed, extracted (i.e., immersed in toluene which was decanted and replaced about every 8 hours) at room temperature for about 48 to about 72 hours, and deswelled with a series of toluene/methanol mixtures. The concentration of the toluene/methanol mixture can be changed in 10% increments about every 12 to 24 hours, starting with the ratio of toluene to methanol equal to about 90 to 10, and ending with 100% methanol. The network samples may then be removed from the solvent and dried in a vacuum oven at about 60° C. to constant weight over about 3 days. The amount of sol can be obtained from the weight difference of the networks samples before and after extraction.

It will be appreciated that the foregoing procedure results in the synthesis of new multi-component polymeric compositions containing polyisobutylene.

In order to demonstrate practice of the invention, the following experiments were carried out. The following are illustrative of the nature of the invention only, but should not be construed as limiting the scope of the invention. The scope of the invention resides in the invention as hereinafter claimed.

Initially, several bicomponent networks were synthesized by endlinking allyl-ended, tri-telechelic PIBs with a plurality of polysiloxanes via hydrosilation as set forth hereinabove. The allyl-ended, tri-telechelic PIBs, R(PIB-allyl)$_3$, were synthesized as discussed hereinabove, and the number average end functionality ($\bar{F}n$) of the allyl-ended, tri-telechelic PIBs was determined by 600 OMz HNMR spectroscopy. Several of these PIBs are represented in Table I hereinbelow. The abbreviation used in the first column of Table I is explained for the first sample as follows. For 3A/32.2, 3A refers to a three-arm star PIB; 32.2 indicates the $\bar{M}n(\times10^{-3})$ of PIB. The second and third columns show number average molecular weights as determined by GPC with LLS and RI detectors ($\times10^{-3}$ g/mol). The forth and fifth columns show $\bar{M}w/\bar{M}n$ and $\bar{F}n$, i.e., molecular weight distribution by GPC, and the number average degree of allyl functionality determined by quantitative HNMR experiments, respectively. The Tg of representative products was approximately −75° C.

TABLE I

Characterization Data for Representative allyl-ended, tritelechelic Polyisobutylene

| R(PIB-allyl)$_3$ | $\bar{M}n \times 10^{-3(g/mol)}$ | | $\bar{M}w/\bar{M}n$ | $\bar{F}n$ |
| --- | --- | --- | --- | --- |
| | GPC (LLS)* | GPC (RI) | | |
| 3A/32.2 | 32.2 | 37.5 | 1.13 | 2.95 |
| 3A/22.4 | 22.4 | 20.3 | 1.13 | 2.93 |
| 3A/16.0 | 16.0 | 14.2 | 1.15 | 3.00 |
| 3A/12.0 | 12.0 | 13.0 | 1.29 | 2.98 |
| 3A/62.2 | 62.2 | 52.0 | 1.04 | 3.00 |

*calculated using Astra 4.0 software.

Further with respect to the characterization of the allyl-ended, tritelechelic polyisobutylenes, FIG. 1 shows the proton NMR spectrum of a R(PIB-allyl)$_3$. $\bar{F}n$ was calculated from the average of the ratio of each of the allyl peaks ($\partial$=2.0, 5.0, 5.8) to the initiator residue (peak at $\partial$=7.1). These data show that alkylation by quenching the living polymer with allyltrimethylsilane is essentially quantitative.

With respect to the representative polysiloxanes, these compounds were synthesized as described hereinabove, and the molecular weights of these polysiloxanes were determined by 600 MHz NMR spectroscopy, while the Tg (−120° C.) was determined by DSC. Table II shows representative polysiloxanes synthesized by equilibrium polymerization of $D_4$ and $M_2^H$.

During polymerization, the tetramer produces the chain, while the chain stopper produces the chain ends, guaranteeing a $\bar{F}n$=2 of SiH groups. The molecular weight is controlled by the $[D_4]/[M_2^H]$ ratio. The $\bar{M}n$ was calculated by NMR spectroscopy from the integrated ratio of the Si—CH$_3$ peak ($\partial$=0.0) to the SiH peak ($\partial$=4.6). The $\bar{M}n$ calculated by NMR spectroscopy is slightly higher than the theoretical $\bar{M}n$ because of contamination by cyclic oligomers formed during the equilibrium. Small amounts of cyclic oligomers inevitably contaminating the purified product increase the area of the Si—CH$_3$ peak relative to the area of the SiH peak, resulting in an overestimation of Mn. Overall, the NMR molecular weight data correlates well with theoretical values.

TABLE II

Synthesis Data of SiH-Terminated Polydimethylsiloxane (PDMS)

| $M_2^H D_n$ where n = | $D_4$ (g) | $M_2^H$ (g) | $\bar{M}n \times 10^{-3}$ (g/mol) | |
| --- | --- | --- | --- | --- |
| | | | Theor. | NMR |
| 18* | — | — | 1.5 | 1.8 |
| 80 | 97.8 | 2.22 | 6.1 | 6.9 |

TABLE II-continued

Synthesis Data of SiH-Terminated Polydimethylsiloxane (PDMS)

| $M_2^H D_n$ where n = | $D_4$ (g) | $M_2^H$ (g) | $\overline{Mn} \times 10^{-3}$ (g/mol) Theor. | NMR |
|---|---|---|---|---|
| 125 | 98.6 | 1.43 | 9.4 | 10.0 |
| 180 | 99.0 | 1.00 | 13.5 | 14.4 |
| 250 | 99.3 | 0.72 | 18.7 | 20.4 |

*Obtained from Shin-Etsu Chemical Co.

With respect to synthesis of a bicomponent network, optimum network formation conditions were judged by determining the amount of soluble fraction (sol) extracted from the networks post-cure. By controlling the experimental conditions, the extent of phase separation and the size of the phase separated domains can be controlled.

The first model experiment concerned the concentration of the Pt catalyst solution. The best cure was obtained with 500 ppm Pt (relative to SiH). The sol decreased with increasing catalyst concentration up to 500 ppm at which point it began to increase with increasing amounts of Pt. Conceivably, too little catalyst limited hydrosilation, whereas too much Pt increased the rate of side reactions.

Figure 2:
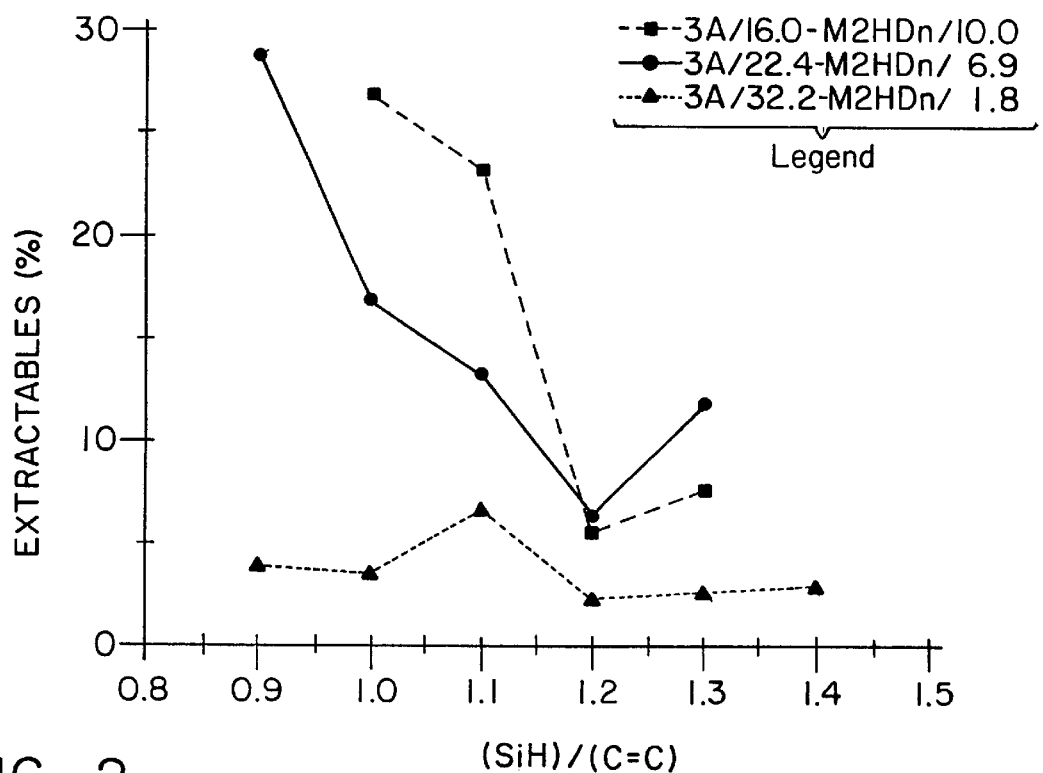
FIG. 2 is a plot of % extractable versus [SiH]/[C=C]

The synthesis of model networks demands that the stoichiometry of the functional groups leading to crosslinking be 1:1. However, model experiments showed that [SiH]/[C=C]=1 did not result in the most efficient crosslinking. FIG. 2 shows the results of a series of experiments done to determine the optimum [SiH]/[C=C] ratio. According to the data, the best networks were obtained at [SiH]/[C=C]=1.2. While not wishing to be bound by theory, reactions other than hydrosilation also evidently consumed the SiH. It is known that hydrolysis of the Si—H bond in the presence of minute amounts of water is accelerated by Pt catalysts.

The Si—OH can either undergo condensation with another Si—OH, or react with unreacted Si—H, releasing $H_2$; both reactions produce a new Si—O—Si linkage. Bubbles in several samples (attributed to $H_2$) suggest such side reactions. In line with previous observations, it seems that by increasing the Pt concentration the side reactions are also accelerated. Thus, optimum crosslinking requires a slight excess of SiH.

Figure 3:
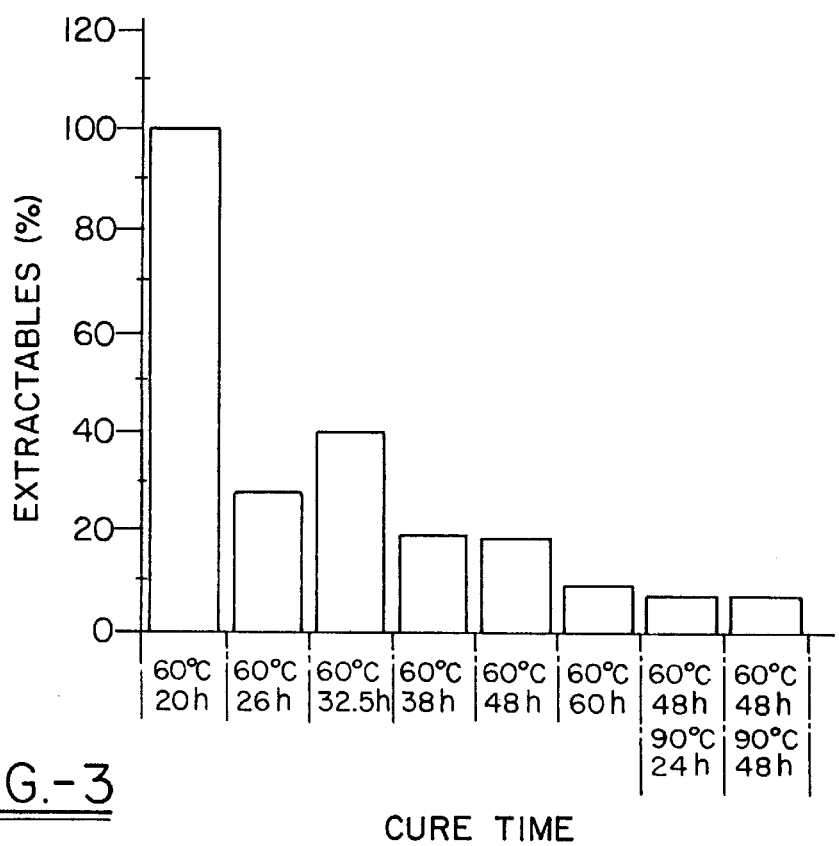
FIG. 3 is a plot of % extractable versus Cure Time for 3A/16.0-M$_2{}^H$D$_n$/10.0.

A series of model experiments was performed to determine the time necessary for efficient crosslinking at 60° C. FIG. 3 shows the extractables versus cure time for a PIB/PDMS BCN. The last two samples were initially cured at 60° C., and post-cured at 90° C. From these experiments it was decided that an efficient cure regimen would be about 48 hours at 60° C., followed by about 24 hours at 90° C. post-cure.

In order to demonstrate practice of the invention, a series of PIB/PDMS BCNs of varying compositions with an average molecular weight between crosslinks ($\overline{Mc}$) of about 20,000 g/mol were synthesized. Table III provides sample compositions and synthesis data. The symbolism used in Table III is described as follows. In the first sample, 3A/32.2-$M_2^H D_n$/1.8, 3A refers to a three arm star allyl-terminated PIB; 32.2 indicates the $\overline{Mn}$ ($\times 10^{-3}$) of PDMS; $M_2^H D_n$ equals ditelechelic PDMS; and 1.8 refers to the $\overline{Mn}$ ($\times 10^{-3}$) of PDMS. Sol fractions below about 10% indicate the formation of satisfactory networks.

TABLE III

Synthesis of PIB/PDMS BCNs.

| Samples | PIB/PDMS (wt %) | SiH:C = C | Extractables (%) | $\overline{Mc} \times 10^{-3}$ (g/mol) |
|---|---|---|---|---|
| 3A/32.2-M2HDn/1.8 | 92/8 | 1.2:1 | 3.0 | 23.3 |
| 3A/22.4-M2HDN/6.9 | 70/30 | 1.2:1 | 6.0 | 21.8 |
| 3A/16.0-M2HDn/10.0 | 50/50 | 1.2:1 | 8.0 | 20.7 |
| 3A/12.0-M2HDn/14.4 | 35/65 | 1.3:1 | 12.0 | 22.4 |

Upon review of the data and the BCN films, it was surprisingly noted that the BCN films (about 0.8 mm thick) were optically clear over the entire composition range examined (small newsprint clearly legible upon overlay), suggesting the presence of very efficient phase mixing. This characterization of the BCNs is also supported by complex DSC scans, in contrast to clearly discernible Tgs observed by DSC for the prepolymers. Also, the mechanical properties (strength/modulus/elongation) of the BCNs appear to be satisfactory for a variety of applications.

Continuing with the experiments, linear ditelechelic allyl-ended PIBs were synthesized by living polymerization of isobutylene followed by quantitative end-functionalization to the —CH2CH=CH2 as described hereinabove. Difunctional SiH-terminated polydimethylsiloxanes (M₂HDn where n=number average degree of polymerization) were also synthesized as described hereinabove. These polymers were then dissolved in toluene, affording a clear homogenous solution. A $H_2PtCl_6$ catalyst solution was added (550 ppm relative to SiH) and the solution was mixed, poured into a Teflon mold, covered, and place in an oven at 60° C. for about 48 hours and 90° C. for about 24 hours. The molded pieces were then removed from the oven and placed in toluene for dissolution and subsequent characterization. The resultant product were new PIB/PDMS multiblock copolymers.

The reaction conditions were determined through model experiments, with the results as shown in Table IV hereinbelow.

TABLE IV

Synthesis Data for PIB/PDMS Multiblock Copolymers

| Trial 23.3K PIB + 10.0K PDMS | SiH:C = C | $\overline{Mn}$ | $\overline{Mw}$ | $\overline{Mw}/\overline{Mn}$ |
|---|---|---|---|---|
| ABn#1 | 0.8:1 | 28.6 | 44.1 | 1.54 |
| ABn#2 | 0.9:1 | 27.9 | 47.5 | 1.70 |
| ABn#3 | 1.0:1 | 24.3 | 29.6 | 1.22 |
|  |  | 86.2 | 105.9 | 1.23 |
| ABn#4 | 1.1:1 | 28.7 | 78.7 | 2.74 |
|  |  | 89.8 | 115.2 | 1.28 |
| ABn#5 | 1.2:1 | 24.1 | 29.9 | 1.24 |
|  |  | 100.5 | 161.7 | 1.61 |
|  |  | 1813.6 | 1981.3 | 1.09 |

The soluble fractions were dissolved in tetrahydrofuran and characterized with GPC equipped with a refractive index detector. In all cases except ABn#5, there was a fraction of the molded polymer piece that was not soluble in toluene even after weeks of extracting. It is suggested that the cyclic copolymers became interlinked during the reaction. If of sufficient molecular weight and size, these catenanes could form a network-like structure that would only swell but not dissolve in solvents.

From the GPC data, it is evident that a mixture of PIB/PDMS multiblock copolymers was synthesized. In all GPC chromatographs there was a high molecular weight shoulder on the original PIB peak. As the SiH:C=C ratio increased, the amount of high molecular weight products increased.

Next, several polyisobutylene networks were synthesized by endlinking allyl-ended PIBs with hexamethylhexahydrocyclosiloxane ($D_6^H$) via hydrosilation. Table V hereinbelow provides sample compositions and synthesis data. The symbolism used in Table V is described as follows. In the first sample, $2A/23.3\text{-}D_6^H$, 2A refers to a linear difunctional polyisobutylene; 23.3 indicates the $\overline{M}n(\times 10^{-3})$ of PIB, $D_6^H$ refers to the fact that hexamethylhexahydrocyclosiloxane was used as the endlinking agent. Sample $3A/16.0D_6H$ refers to a three arm star tritelechelic polyisobutylene having a number average molecular weight of about $16 \times 10^{-3}$ g/mol linked by hexamethylhexahydrocyclosiloxane. Minimal soluble fractions indicate the formation of satisfactory model networks that can be further using rubber elasticity theories.

TABLE V

Synthesis of PIB Networks

| Sample | SiH:C = C | Extractables (%) | $\overline{M}c(\times 10^{-3}$ g/mol Theoretical |
|---|---|---|---|
| $2A/23.3\text{-}D_6^H$ | 1.5:1 | <2 | 23.3 |
|  | 1.8:1 | <2 | 23.3 |
|  | 2.0:1 | <2 | 23.3 |
| $3A/16.0\text{-}D_6^H$ | 1.0:1 | 50 | 5.3 |
|  | 2.0:1 | <2 | 5.3 |
|  | 3.0:1 | <2 | 10.7 |
| $3A/62.2\text{-}D_6^H$ | 3.0:1 | 5 | 41.5 |

Thus, it should be evident that the methods of the present invention are highly effective in synthesizing polymeric compositions, including bicomponent networks, multiblock copolymers and polyisobutylene networks. While the invention with respect to bicomponent networks and multiblock copolymers is particularly suited for PIB and PDMS, it is not necessarily limited thereto, it being understood that other multifunctional, linear siloxane compounds terminated with a Si—H moiety could also be utilized. Further, the use of a cyclosiloxane with respect to the synthesis of the polyisobutylene networks should not necessarily be limited to hexamethylhexahydrocyclosiloxane, it being understood that other linear siloxanes or cyclosiloxanes could also be employed.

Based upon the foregoing disclosure, it should now be apparent that the use of the components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the described invention.

What is claimed is:

1. A bicomponent network comprising the hydrosilation reaction product of a plurality of multi-functional, allyl-ended polyisobutylenes linked to a plurality of multi-functional siloxane compounds having at least two SiH moieties for each siloxane compound.

2. The bicomponent network of claim 1, wherein said plurality of siloxane compounds are ditelechelic polysiloxanes and are endlinked to said plurality of polyisobutylenes.

3. The bicomponent network of claim 2, wherein said ditelechelic polysiloxanes are linear.

4. The bicomponent network of claim 2, wherein said polysiloxanes are SiH-ended polydimethylsiloxanes.

5. The bicomponent network of claim 2, wherein said polyisobutylenes are tri-telechelic polyisobutylenes.

6. The bicomponent network of claim 1, wherein said polyisobutylenes are selected from the group consisting of ditelechelic and tritelechelic polyisobutylenes.

7. The bicomponent network of claim 1, wherein said siloxane compounds are cyclosiloxanes.

8. The bicomponent network of claim 7, wherein said cyclosiloxanes are cyclosiloxanes of the formula

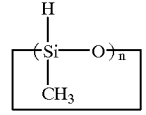

where n=3 to 16.

9. The bicomponent network of claim 7, wherein said cyclosiloxanes are hexamethyl hexahydrocyclosiloxanes.

10. A multiblock copolymer comprising the hydrosilation reaction product of a plurality of ditelechelic, allyl-terminated polyisobutylenes endlinked to a plurality of ditelechelic, linear polysiloxanes having up to two SiH moieties for each polysiloxane, wherein the chemical and physical properties of the multiblock copolymer are different from the chemical and physical properties of said polyisobutylenes or said polysiloxanes.

11. The multiblock copolymer of claim 10, wherein said polysiloxanes are polydimethylsiloxanes.

12. A polymeric network comprising the hydrosilation reaction product of a plurality of multi-functional, allyl-terminated polyisobutylenes linked to a plurality of multi-functional siloxane compounds having at least two SiH moieties for each siloxane compound.

13. The polymeric network of claim 12, wherein said plurality of polyisobutylenes having the same chemical and physical properties and wherein said polymer network has essentially the same chemical and physical properties as said polyisobutylenes.

14. The polymeric network of claim 12, wherein said polyisobutylenes are selected from the group consisting of ditelechelic and tritelechelic polyisobutylenes.

15. The polymeric network of claim 14, wherein said polyisobutylenes are ditelechelic and endlinked to said siloxane compounds such that the polymeric network is elastomeric.

16. The polymeric network of claim 14, wherein said polyisobutylenes are tritelechelic and endlinked to said siloxane compounds such that the polymeric network is elastomeric.

17. The polymeric network of claim 12, wherein said siloxane compounds are cyclosiloxanes.

18. The polymeric network of claim 17, wherein said cyclosiloxanes are cyclosiloxanes of the formula

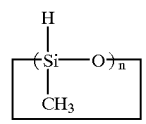

where n=3 to 16.

19. The polymeric network of claim 17, wherein said cyclosiloxanes are hexamethylhexahydrocyclosiloxanes.

20. A method for synthesizing a polymeric network composition comprising hydrosilating a plurality of multifunctional, allyl-terminated polyisobutylenes with a plurality of siloxane compounds having at least two SiH moieties for each siloxane compound.

21. The method of claim 20, wherein the step of hydrosilating includes crosslinking said plurality of polyisobutylenes with said siloxane compounds, wherein said siloxane compounds are cyclosiloxanes.

22. The method of claim 20, wherein the step of hydrosilating includes crosslinking said plurality of polyisobutylenes with said siloxane compounds, wherein said siloxane compounds are ditelechelic, linear polysiloxanes and wherein the polymeric network is a bicomponent network.

23. The method of claim 20, wherein the step of hydrosilating including endlinking said plurality of polyisobutylenes to said siloxane compounds, wherein said polyisobutylenes are ditelechelic and said siloxane compounds are ditelechelic, linear polysiloxanes and wherein the polymeric composition is a multi-block copolymer.

* * * * *